(12) United States Patent
Wang

(10) Patent No.: US 11,655,081 B2
(45) Date of Patent: May 23, 2023

(54) TAMPER-RESISTANT AIR-PERMEABLE CONTAINER

(71) Applicant: SOUTH PLASTIC INDUSTRY CO., LTD., New Taipei (TW)

(72) Inventor: Tong-Chang Wang, New Taipei (TW)

(73) Assignee: SOUTH PLASTIC INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 17/689,673

(22) Filed: Mar. 8, 2022

(65) Prior Publication Data

US 2022/0194669 A1 Jun. 23, 2022

Related U.S. Application Data

(63) Continuation of application No. 17/033,957, filed on Sep. 28, 2020, now Pat. No. 11,312,545.

(30) Foreign Application Priority Data

Nov. 8, 2019 (TW) ................................. 108140742

(51) Int. Cl.
*B65D 43/02* (2006.01)

(52) U.S. Cl.
CPC ...... *B65D 43/0272* (2013.01); *B65D 2205/00* (2013.01); *B65D 2401/00* (2020.05)

(58) Field of Classification Search
CPC ............ B65D 43/0272; B65D 43/0264; B65D 43/0235; B65D 43/021; B65D 43/0204; B65D 43/0214; B65D 39/16; B65D 45/16

USPC ....... 220/789, 780, 324, 315, 805, 802, 801, 220/796, 266, 265, 260

See application file for complete search history.

(56) References Cited

U.S. PATENT DOCUMENTS

| | | | |
|---|---|---|---|
| 6,116,501 | A | 9/2000 | Hupp |
| 9,016,503 | B2 | 4/2015 | Barbier et al. |
| 2005/0161455 | A1 | 7/2005 | Studee |
| 2012/0292322 | A1 | 11/2012 | Meyer et al. |
| 2014/0035867 | A1 | 2/2014 | Azumi et al. |
| 2017/0057706 | A1 | 3/2017 | Wang |
| 2017/0121080 | A1 | 5/2017 | Wang |
| 2018/0194523 | A1 | 7/2018 | Plummer et al. |
| 2018/0273254 | A1 | 9/2018 | Hansen et al. |
| 2020/0055639 | A1 | 2/2020 | Snedden et al. |

(Continued)

FOREIGN PATENT DOCUMENTS

GB 2040267 A 8/1980

*Primary Examiner* — Robert J Hicks
(74) *Attorney, Agent, or Firm* — Rabin & Berdo, P.C.

(57) ABSTRACT

A tamper-resistant air-permeable container includes a cover having a bottom that is formed with a first wall having primary troughs and primary blocks and formed with a retaining engagement portion; and a box including a receiving space and having a second wall that is provided with a first step part lower than the second wall and a second step part lower than the first step part to define forming therebetween a retaining engagement groove. The second wall is formed with secondary troughs, each including a curved section, such that each of the secondary troughs has a curved configuration. When the cover is combined with the box, the retaining engagement portions of the cover are fit into and retained in the retaining engagement groove. The primary troughs and the secondary troughs form passages in communication with the receiving space.

18 Claims, 8 Drawing Sheets

(56) References Cited

U.S. PATENT DOCUMENTS

2020/0399018 A1\* 12/2020 Mueller ............... B65D 43/162
2021/0107707 A1\* 4/2021 Lotfi .................. B65D 43/0235
2021/0114779 A1\* 4/2021 Bontrager ............ B65D 43/162

\* cited by examiner

TAMPER-RESISTANT AIR-PERMEABLE CONTAINER

CROSS-REFERENCE TO RELATED APPLICATION

This application is a Continuation application of Ser. No. 17/033,957, filed on Sep. 28, 2020 with claiming foreign priority of TW 108140742, filed on Nov. 8, 2019. The prior application is herewith incorporated by reference in its entirety.

BACKGROUND

Technical Field

The present invention relates to a container, and more particularly to a container that has excellent air permeability, is unrecoverable after being opened, and is tamper-evident with bare eyes.

Related Art

Various plastic containers that are made through vacuum forming are available, including boxes, cups, or bowls, which are fit for storage of food in order to keep the food fresh. However, for the containers that are currently available, air permeability is achieved by means of simple hole-like features, and foreign objects and dust and even a sharp object that is intentionally used by an unauthorized person may penetrate through the holes to damage or destruct the food or fruits contained in the container or even a needle may be used to inject medicine or drug into the food or fruit. In view of such problems, the air permeable structure requires further improvement.

Further, some consumers may open the plastic container, without proper authorization, to check if the food contained in the container is intact and fresh. This would damage the container and cause contamination to the food contained in the container.

The plastic containers have been improved to include a tamper-evident feature. Such a feature often involves a breakable perforation line. An edge generated through breaking of the perforation line may be re-fit to a torn part, making it hard for a user to identify, with bare eyes, if the container has been opened. This requires further improvement for the plastic container.

SUMMARY

In view of the above problems, the present invention provides a tamper-resistant air-permeable container, which comprises: a cover having a bottom that is formed with a first wall in the form of a loop, the first wall having an outward-facing surface that is formed with a plurality of primary troughs that are spaced from each other, each of the primary troughs including a primary block arranged therebetween, the first wall and each of the primary blocks being each formed with a retaining engagement portion on a lower portion of the outward-facing surface; and a box, which includes a receiving space, the box having a top surface that is formed with a second wall, the second wall having an inward-facing surface that is provided with a first step part having a height lower than the second wall and a second step part having a height lower than the first step part, the first, step part and the second step part forming therebetween a retaining engagement groove, the inward-facing surface of the second wall being formed with a plurality of secondary troughs, each of the secondary troughs including a curved section, such that each of the secondary troughs has a curved configuration, wherein when the cover is combined with the box, the retaining engagement portions of the cover are fit into and retained in the retaining engagement groove and each of the primary blocks is set in coupling engagement with the first step part and the second step part, so that each of the primary troughs is set to correspond to each of the secondary troughs to form a passage that is in communication with the receiving space. The cover has a top, from one side of which a plate that is made elastic, is extended. The plate has an end that is formed with a primary coupler facing downward. The second wall of the box includes at least one primary notch, and a flange is extended horizontally in an outward direction from a bottom of the second wall. The flange includes a secondary notch, and the secondary notch is connected through a perforation line with a secondary coupler. The secondary coupler includes a tertiary trough, and when the cover is combined to the top of the box, the primary coupler engages with the tertiary trough.

Advantage of the present invention are as follows:

Based on the above-described structure, when the cover is set in combination with the box, the passage formed of each of the primary troughs and each of the secondary troughs provide an effect of air permeation, in order to protect fruits placed in the container from deteriorating, and since each of the secondary troughs is set in curved configuration, it is possible to greatly reduce the potential risk of entry of a foreign object or an unauthorized person intentionally damaging the fruits or injecting illegal drugs into the fruits with a needle.

The primary coupler and the secondary coupler once coupled are not easily detached, and the secondary coupler, upon being torn open, is still kept in combination with the primary coupler. Further, the secondary coupler is caused to restore in position by the plate, so as to set the secondary coupler to locate above the secondary notch with the plate being pushed outside the secondary notch, so as not to re-engage with the secondary notch. Consequentially, a user may easily identify that the secondary coupler has been torn open.

DETAILED DESCRIPTION

Figure 1:
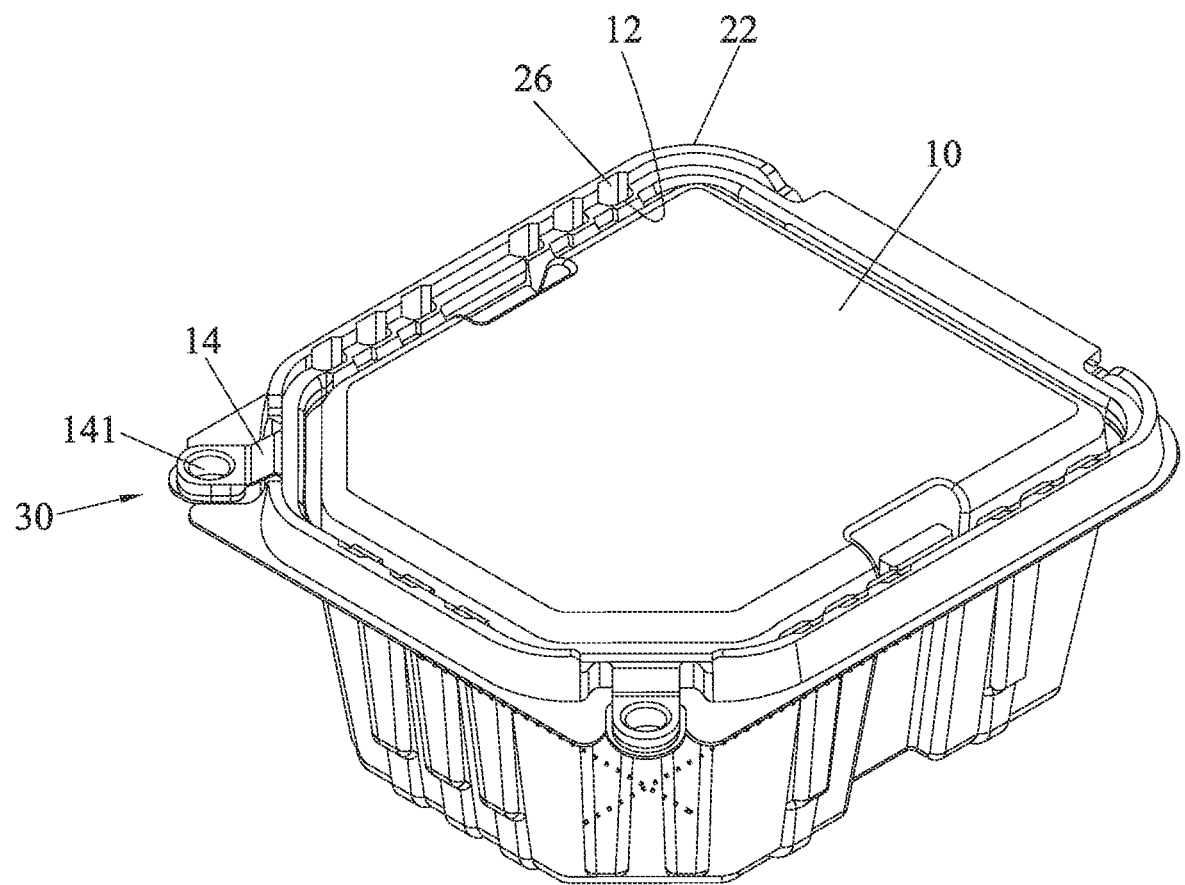
FIG. 1 is a perspective view showing the present invention in a condition that a cover is closed.
Figure 2A:
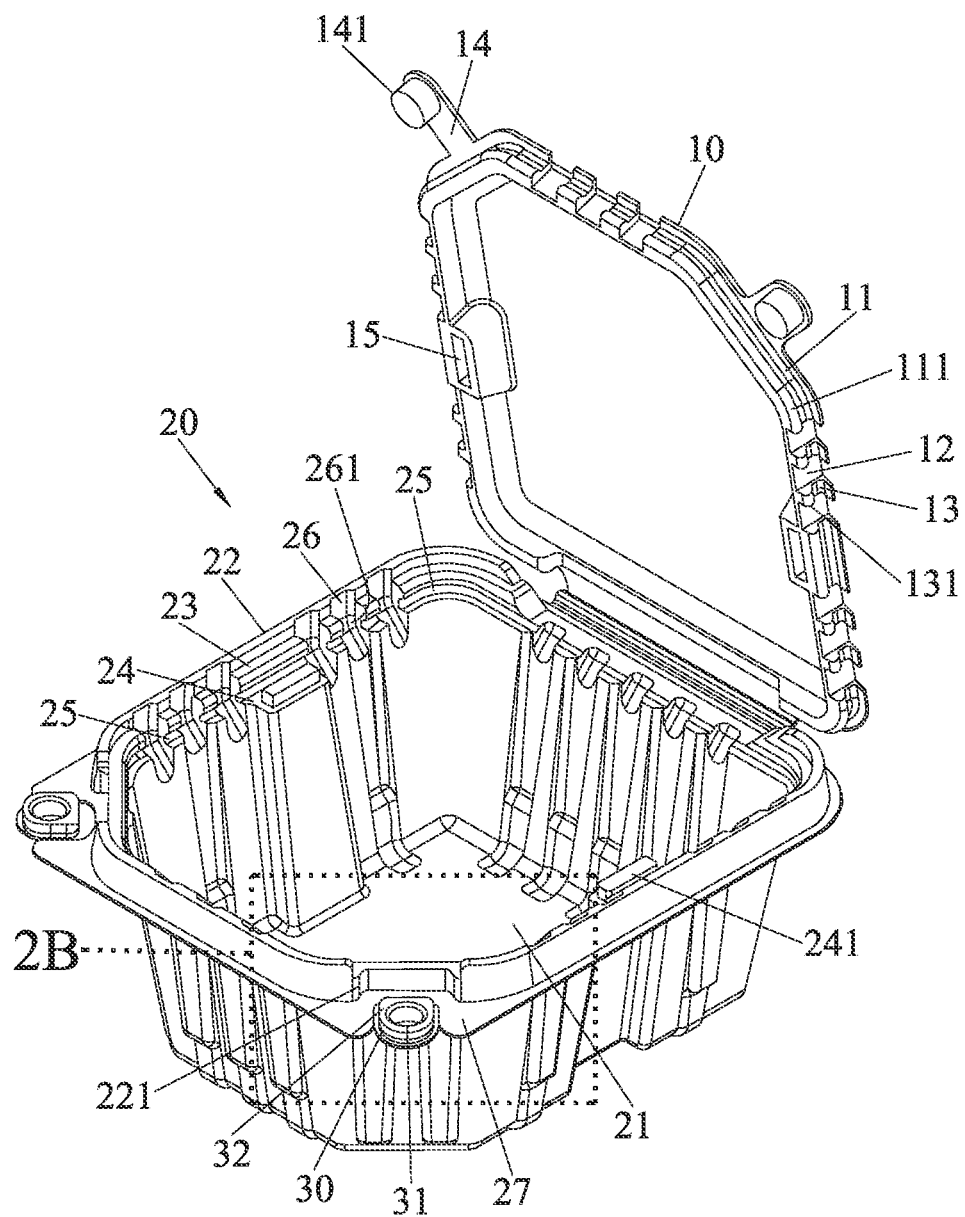
FIG. 2A is a perspective view showing the present invention in a condition that the cover is opened.

Referring to FIGS. 1 and 2A, the present invention provides a tamper-resistant air-permeable container, which comprises the following components:

A cover 10 has a bottom that is provided with a first wall 11, in the form of a loop and perpendicular to the cover 10. The first wall 11 is arranged adjacent to a peripheral edge of the cover 10. The first wall 11 has an outward-facing surface that is formed with a plurality of primary troughs 12 that are spaced from each other. Each of the primary troughs 12 includes a primary block 13 arranged therebetween. The first wall 11 and each of the primary blocks 13 are each formed with a retaining engagement portion 111, 131 on a lower portion of the outward-facing surface.

The peripheral edge of the cover 10 is extended such that a corrugated configuration of a combination of projections and recesses is formed as the edge extends to follow each of the primary troughs 12, in order to increase an amount of air permeation.

The cover 10 has a top, from one side of which a plate 14 that is made elastic or flexible, is extended. The plate 14 has a predetermined length and has an end that is formed with primary coupler 141 facing downward.

Figure 3:
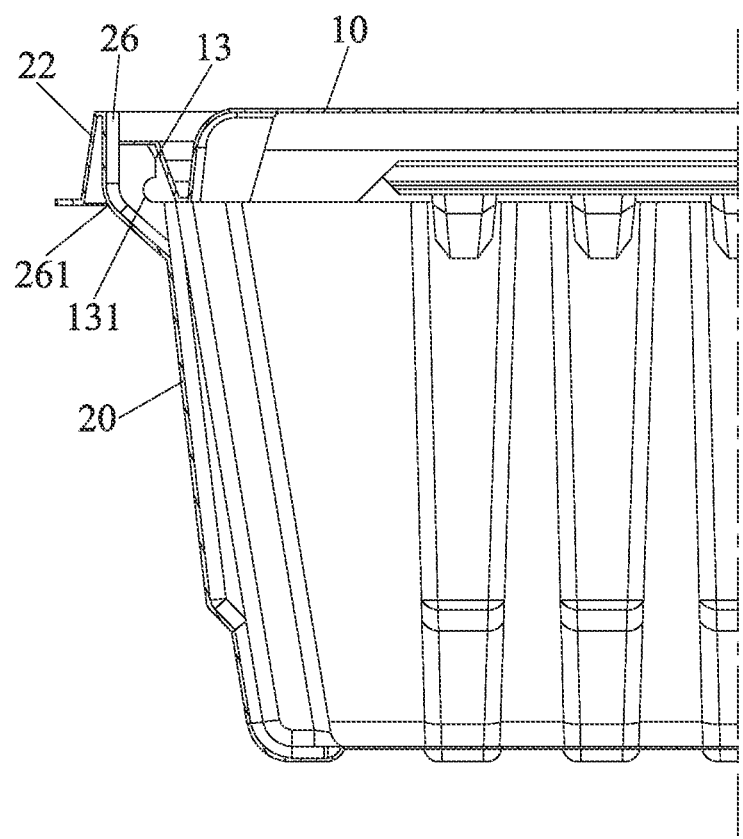
FIG. 3 is a cross-sectional view of FIG. 1.

Referring to FIGS. 2A and 3, a box 20 includes a receiving space 21 that is in communication with the outside. The box 20 has a top surface that is formed with a second wall 22 perpendicular thereto. The second wall 22 has an inward-facing surface that is provided with a first step part 23 having a height lower than the second wall 22 and a second step part 24 having a height lower than the first step part 23. The first step part 23 and the second step part 24 form therebetween a retaining engagement groove 25. The inward-facing surface of the second wall 22 is formed with a plurality of secondary troughs 26, and each of the secondary troughs 26 includes a curved section 261, such that each of the secondary troughs 26 exhibits a curved or bent configuration. When the cover 10 is combined with the box 20, the retaining engagement portions 111, 131 of the cover 10 are fit into and retained in the retaining engagement groove 25 and each of the primary blocks 13 is set in coupling engagement with the first step part 23 and the second step part 24, so that each of the primary troughs 12 is set to correspond to a corresponding one of the secondary troughs 26 to form a passage that is in communication with the receiving space 21.

Figure 5:
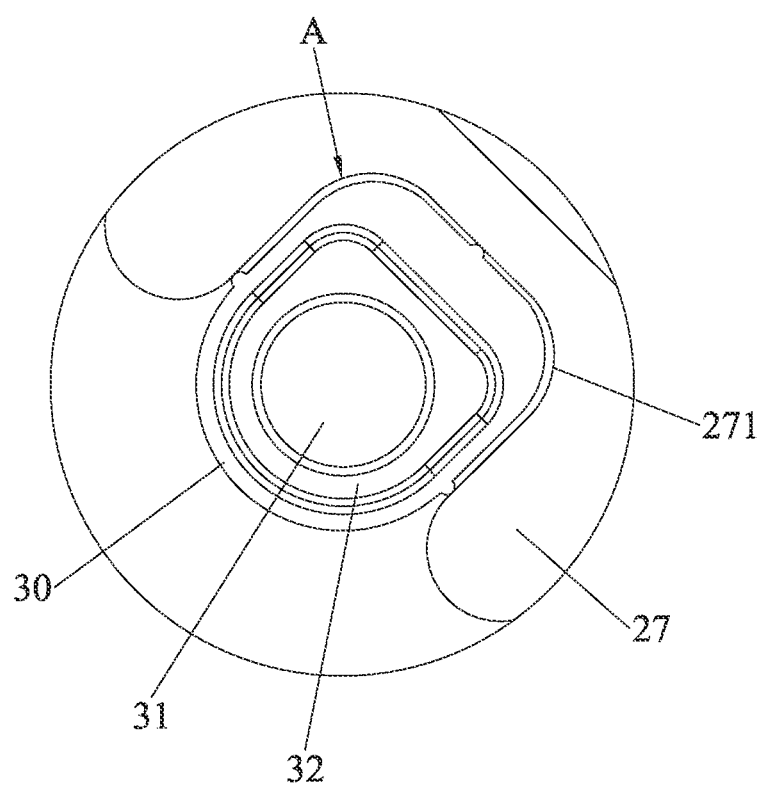
FIG. 5 is a top plan view showing the secondary coupler and a secondary notch according to the present invention.

Referring to FIG. 1, FIG. 2 and FIG. 5, the second wall 22 of the box 20 includes at least one primary notch 221, and a flange 27 is extended horizontally in an outward direction from a bottom of the second wall. The flange includes a secondary notch 271, and the secondary notch 271 is connected, through a perforation line A, with a secondary coupler 30. The secondary coupler 30 includes a tertiary trough 31. When the cover 10 is combined to the top of the box 20, the primary coupler 141 engages with the tertiary trough 31. In some embodiments, as shown in FIG. 1, the secondary coupler 30 does not exceed the region defined by the outer edge of the flange 27 in the top-view of the container. By such configuration, the most outwards part of the container is the flange 27, and thus multiple containers can be arranged more neatly, thereby improving space utilization rate.

In some embodiments, as shown in FIG. 1 and FIG. 2A, in order to move the secondary coupler 30 further inward for being disposed in the region defined by the outer edge of the flange 27, the primary notch 221 is formed by not providing the second wall 22 at the region corresponding to the secondary coupler 30. That is, in these embodiments, at the region corresponding to the secondary coupler 30, the first step part 23 directly faces the secondary coupler 30, and thus the secondary coupler 30 can be moved more inward toward the center of the box 20, thereby easily fitting the secondary coupler 30 in the region defined by the outer edge of the flange 27. However, in some other embodiments, even with the configuration that the second wall 22 is not disposed at the region corresponding to the secondary coupler 30, the secondary coupler 30 still can exceed the region defined by the outer edge of the flange 27.

Figure 2B:
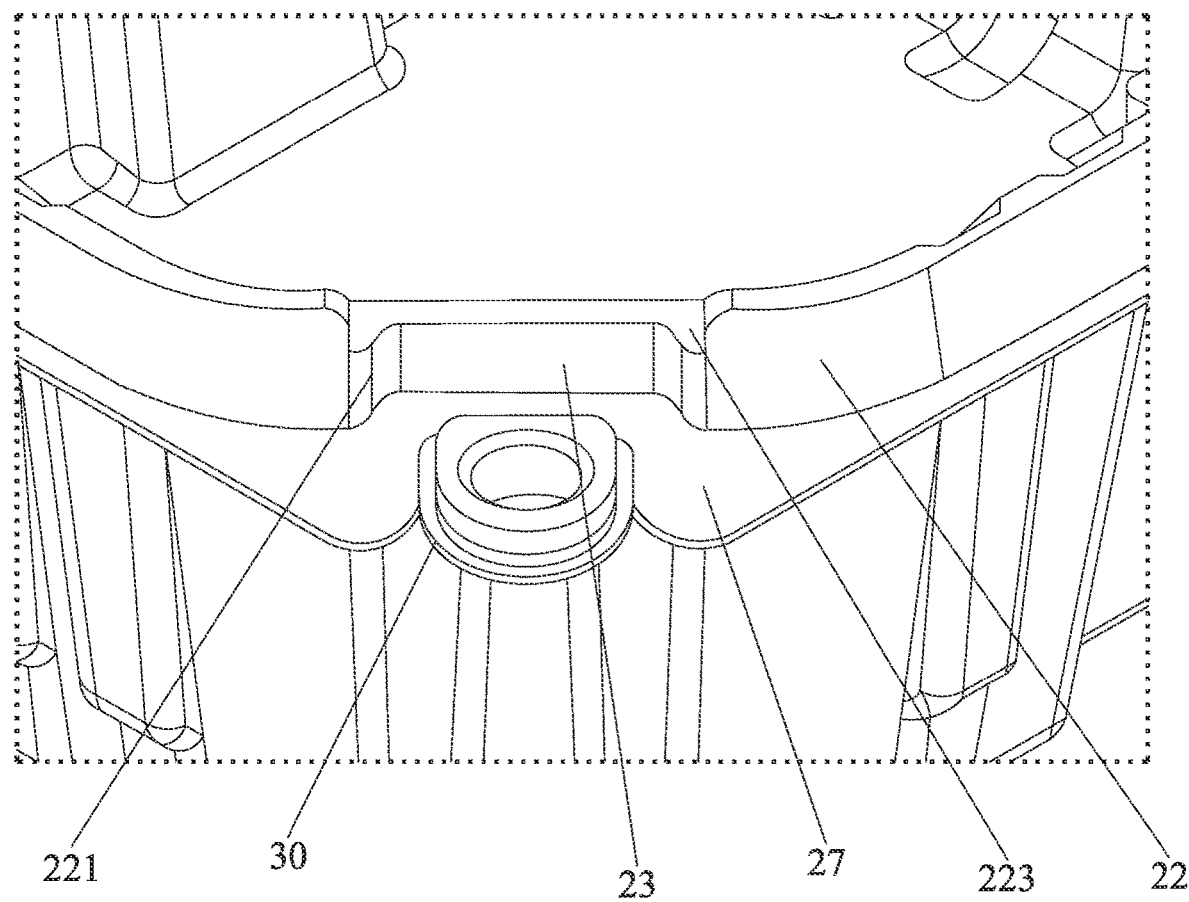
FIG. 2B is enlarged schematic view of the area indicated by the circle 2B shown in FIG. 2A.

Please refer to FIG. 2A, and FIG. 2B. In some other embodiments, when the second wall 22 is not disposed at the region corresponding to the secondary coupler 30 to form the primary notch 221, the first step part 23 has two protrusion portions 223 disposed respectively at two sides of the secondary coupler 30, and each of the two protrusion portions 223 is connected to a closest portion of the second wall 22. With this structure, the second wall 22 and the first step part 23 can be connected with each other relatively smoothly, thereby avoiding generating fragile place (such as a right angle) where stress is easy to concentrate. Therefore, even the thickness of the surrounding wall on the box 20 at the region corresponding to the secondary coupler 30 becomes thinner, the surrounding wall on the box 20 as a whole still maintain certain structural reliability.

Please refer to FIG. 1, FIG. 2A, and FIG. 2B. In some embodiments, since the second wall 22 is not disposed at the region corresponding to the secondary coupler 30 to form the primary notch 221, the second wall 22 is divided into several portions as well. Thus, in these embodiments, due that the height of the first step part 23 is lower than the height of the second wall 22, the plate 14 may extend between the two adjacent portions of the second wall 22. By this configuration, the plate 14 does not have to extend over the second wall 22 to reach the secondary coupler 30. Therefore, during the engagement between the primary coupler 141 and the tertiary trough 31, the height difference between the highest point of the plate 14 and the lowest point of the plate 14 in such configuration will be less than the height difference between the highest point of the plate 14 and the lowest point of the plate 14 with the configuration that the plate 14 extending over the second wall 22 to reach the secondary coupler 30.

Please refer to FIG. 2A and FIG. 5. In some embodiments, in the top-view of the box 20, at the secondary notch 271, the flange 27 surrounds more than half of the circumference of the secondary coupler 30. For example, as shown in FIG. 5, the flange 27 surrounds three sides of the secondary coupler 30, and the circumference of the secondary coupler 30 surrounded by the flange 27 is more than half of the total circumference of the secondary coupler 30. Due that the secondary coupler 30 has the longer surrounded circumference, there are more location options for setting the joint between the flange 27 and the secondary coupler 30, which may provide connections with different directions and thus reduce the chance in accidentally torn off the secondary coupler 30.

Figure 4:
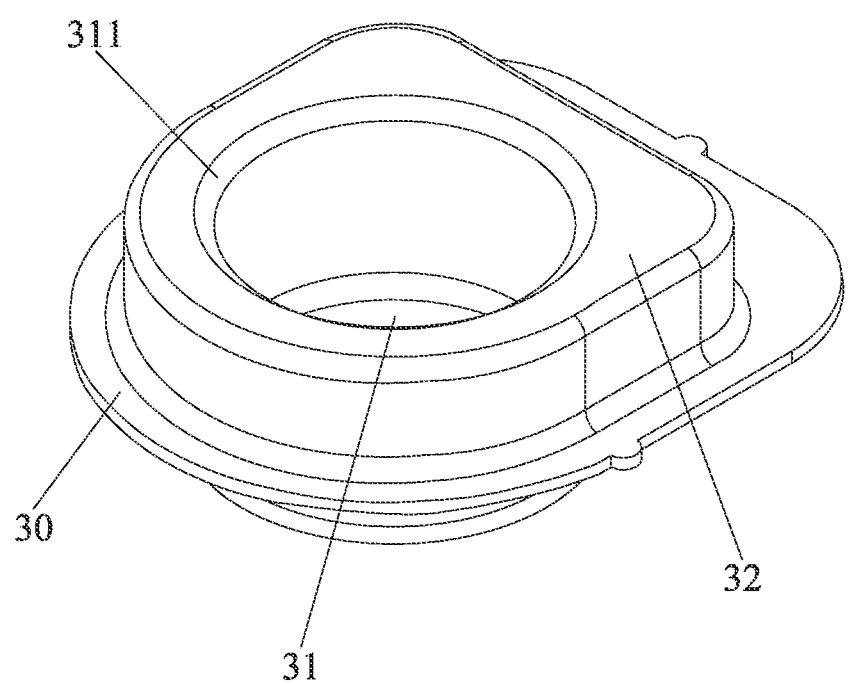
FIG. 4 is a perspective view showing a secondary coupler of the present invention.
Figure 6:
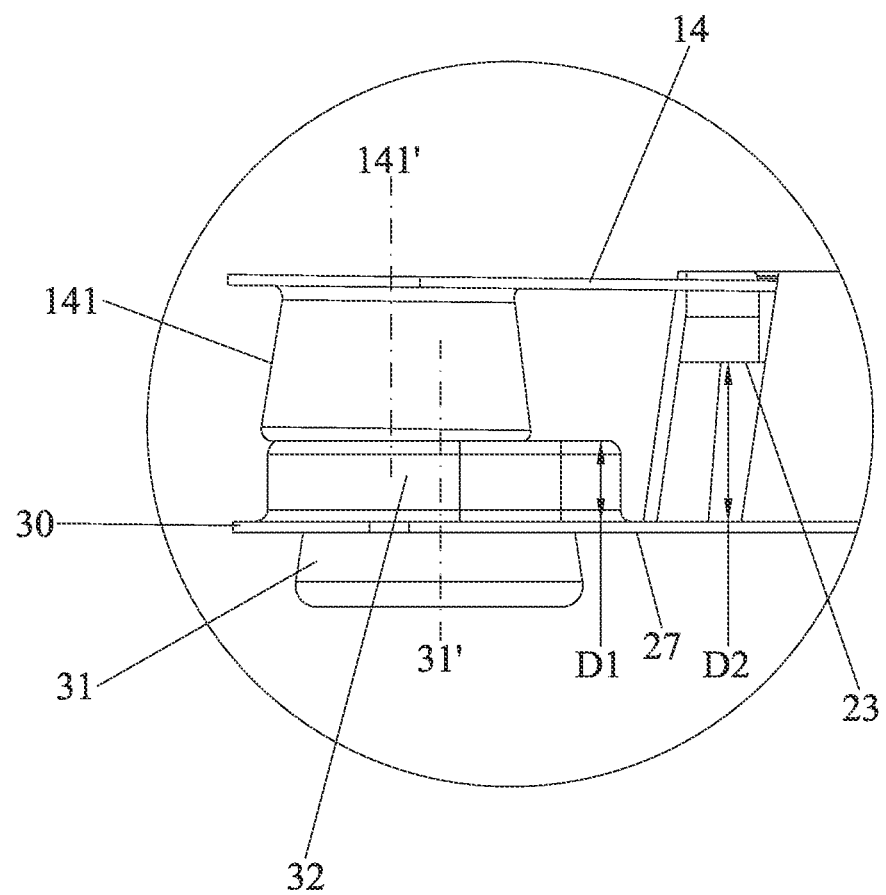
FIG. 6 is a schematic view showing positional deviation between a first coupler and a tertiary trough according to the present invention.
Figure 7:
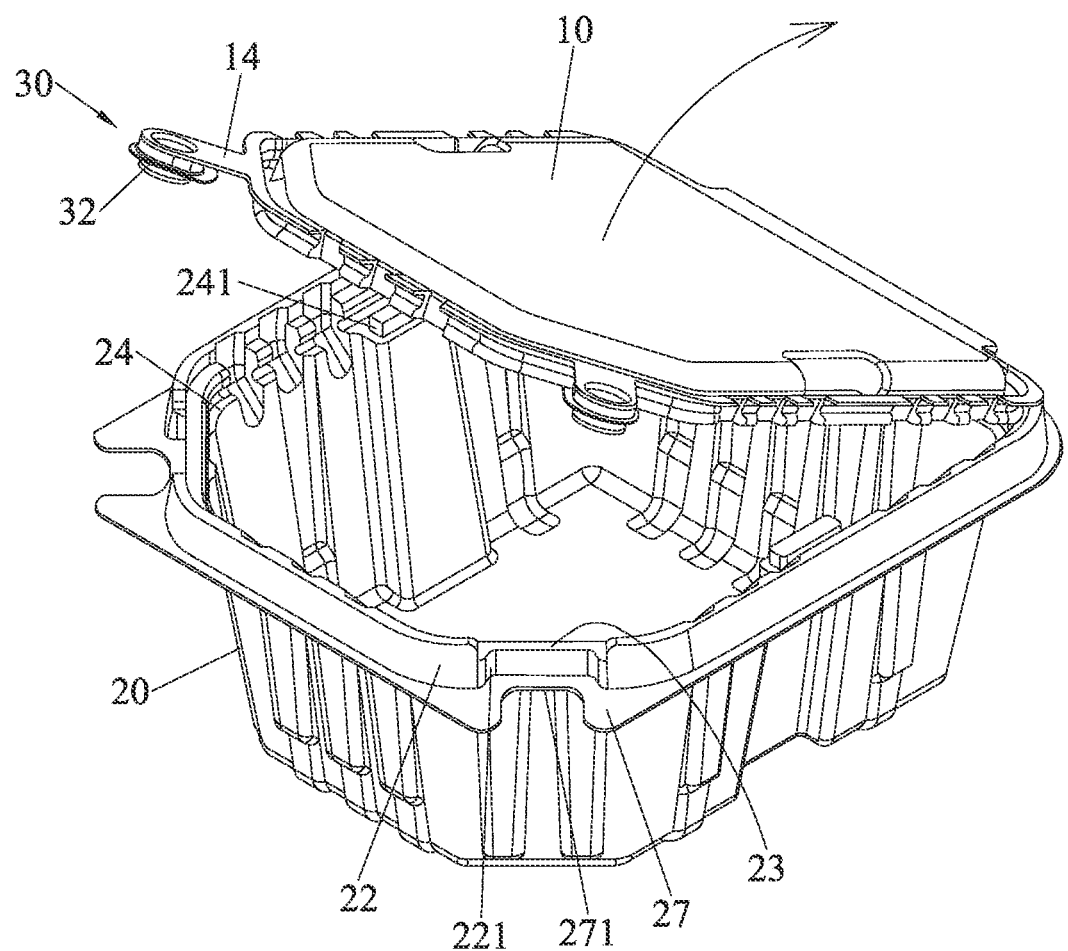
FIG. 7 is a schematic view showing separation between the second coupler and the secondary notch according to the present invention.

Please refer to FIG. 6. In some embodiments, it can be seen that in the side-view of the primary coupler 141 and the tertiary trough 31, the primary coupler 141 has a central axis 141', and the tertiary trough 31 has a central axis 31'. When the primary coupler 141 has not been engaged with the tertiary trough 31 yet, and the plate 14 is parallel to the flange 27, the central axis 31' of the tertiary trough 31 is offset from the central axis 141' of the primary coupler 141. Then, referring to FIGS. 1 and 7, when the cover 10 is combined to the top of the box 20, a bottom of the plate 14 is brought into contact with a top of the first step part 23, while the other end of the plate 14 still can be further pressed down, which causes a change of a direction of the primary coupler 141 to engage with the tertiary trough 31. In some embodiments, for example as shown in FIG. 4, the edge of the opening of the tertiary trough 31 has a guiding bevel 311. When the plate 14 is pushed down so as to engage the primary coupler 141 with the tertiary trough 31, the offset primary coupler 141 can be guided by the guiding bevel 311 to the tertiary trough 31, so that the engagement between the primary coupler 141 and the tertiary trough 31 can be accomplished more smoothly.

Once the secondary coupler 30 is torn along the perforation line A, the plate 14 restores a home position because of the elasticity thereof, making the secondary coupler 30 moved away and located above the secondary notch 271 with a height difference from the flange 27. As such, the secondary coupler 30 can no longer be fit into and retained in the secondary notch 271, and consequentially, a user may easily identify that the secondary coupler 30 has been torn open.

Please refer to FIG. 2A. The first wall 11 of the cover 10 may be further provided, on an inward-facing surface thereof, with at least one positioning recess 15, and the second step part 24 is provided with at least one positioning projection 241, wherein when the cover 10 is combined with the box 20, the positioning projection 241 enters the positioning recess 15.

Please refer to FIGS. 4 and 6. The secondary coupler 30 may include a flat platform portion 32 in an annular or ring configuration protruding towards the plate 14, and the tertiary trough 31 is located at the flat platform portion 32. A distance D1 between the upper surface of the flat platform portion 32 and the flange 27 is less than the distance D2 between the upper surface of the first step part 23 and the flange 27. Thus, when the primary coupler 141 is brought into engagement with the tertiary trough 31, a top of the flat platform portion 32 is set in contact engagement with the bottom of the plate 14. In other words, as shown in FIG. 1, when the primary coupler 141 is brought into engagement with the tertiary trough 31, one end of the bottom of the plate 14 contacts the top of the first step part 23, and the other end of the bottom of the plate 14 contacts a top of the flat platform portion 32, not the flange 27. By such configuration, comparing with the configuration without the flat platform portion 32, the height difference between the highest point of the plate 14 and the lowest point of the plate 14 during the engagement between the primary coupler 141 and the tertiary trough 31 will be less. Therefore, when the primary coupler 141 is engaged with the tertiary trough 31, lower stress will be applied to the root of the plate 14, thereby reducing the chance in damaging or breaking the plate 14.

Please refer to FIG. 6. The primary coupler 141 and/or the tertiary trough 31 may be made in a top-narrowed and bottom-widened form in the side-view of the tertiary trough 31, in order to make force or tight fitting between the primary coupler 141 and the tertiary trough 31.

What is claimed is:

1. A tamper-resistant air-permeable container, comprising:
    a cover, which has a bottom that is provided with a first wall in the form of a loop and perpendicular to the cover, the first wall being adjacent to a peripheral edge of the cover, the first wall having an outward-facing surface that is formed with a plurality of primary troughs that are spaced from each other, each of the primary troughs including a primary block arranged therebetween, the first wall and each of the primary blocks being each formed with a retaining engagement portion on a lower portion of the outward-facing surface; and
    a box, which includes a receiving space that is in communication with the outside, the box having a top surface that is formed with a second wall perpendicular thereto, the second wall having an inward-facing surface that is provided with a first step part having a height lower than the second wall and a second step part having a height lower than the first step part, the first step part and the second step part forming therebetween a retaining engagement groove, the inward-facing surface of the second wall being formed with a plurality of secondary troughs, each of the secondary troughs including a curved section, such that each of the secondary troughs has a curved configuration, wherein when the cover is combined with the box, the retaining engagement portions of the cover are fit into and retained in the retaining engagement groove and each of the primary blocks is set in coupling engagement with the first step part and the second step part, so that each of the primary troughs is set to correspond to each of the secondary troughs to form a passage that is in communication with the receiving space;
    wherein the cover has a top, from one side of which a plate that is made elastic, is extended, the plate having an end that is formed with a primary coupler facing downward; the second wall of the box includes at least one primary notch, a flange being extended horizontally in an outward direction from a bottom of the second wall, the flange including a secondary notch, the secondary notch being connected through a perforation line with a secondary coupler, the secondary coupler including a tertiary trough; when the cover is combined to the top of the box, the primary coupler engages with the tertiary trough.

2. The tamper-resistant air-permeable container according to claim 1, wherein the second wall is not disposed at a region corresponding to the secondary coupler so as to form the primary notch.

3. The tamper-resistant air-permeable container according to claim 2, wherein the first step part has two protrusion portions disposed respectively at two sides of the secondary coupler, and each of the two protrusion portions is connected to a closest portion of the second wall.

4. The tamper-resistant air-permeable container according to claim 2, wherein the plate extends between two adjacent portions of the second wall to reach the secondary coupler.

5. The tamper-resistant air-permeable container according to claim 2, wherein the secondary coupler has a flat platform portion protruding towards the plate;
    the tertiary trough is located at the flat platform portion;
    a distance between an upper surface of the flat platform portion and the flange is less than a distance between an upper surface of the first step part and the flange;
    when the primary coupler is engaged with the tertiary trough, one end of a bottom of the plate contacts a top of the first step part, and the other end of the bottom of the plate contacts a top of the flat platform portion.

6. The tamper-resistant air-permeable container according to claim 1, wherein the secondary coupler does not exceed a region defined by an outer edge of the flange in a top-view of the container.

7. The tamper-resistant air-permeable container according to claim 6, wherein in a top-view of the box, the flange surrounds more than half of the circumference of the secondary coupler.

8. The tamper-resistant air-permeable container according to claim 7, wherein the flange surrounds three sides of the secondary coupler.

9. The tamper-resistant air-permeable container according to claim 7, wherein the second wall is not disposed at a region corresponding to the secondary coupler so as to form the primary notch.

10. The tamper-resistant air-permeable container according to claim 8, wherein the first step part has two protrusion portions disposed respectively at two sides of the secondary coupler, and each of the two protrusion portions is connected to a closest portion of the second wall.

11. The tamper-resistant air-permeable container according to claim 8, wherein the plate extends between two adjacent portions of the second wall to reach the secondary coupler.

12. The tamper-resistant air-permeable container according to claim 1, wherein the secondary coupler has a flat platform portion protruding towards the plate;
   the tertiary trough is located at the flat platform portion;
   a distance between an upper surface of the flat platform portion and the flange is less than a distance between an upper surface of the first step part and the flange;
   when the primary coupler is engaged with the tertiary trough, one end of a bottom of the plate contacts a top of the flat platform portion.

13. The tamper-resistant air-permeable container according to claim 12, wherein an edge of an opening of the tertiary trough has a guiding bevel.

14. The tamper-resistant air-permeable container according to claim 12, wherein in a side-view of the primary coupler and the tertiary trough, the primary coupler has a first central axis, and the tertiary trough has a second central axis;
   when the primary coupler is not engaged with the tertiary trough, and the plate is parallel to the flange, the second central axis of the tertiary trough is offset from the first central axis of the primary coupler.

15. The tamper-resistant air-permeable container according to claim 1, wherein an edge of an opening of the tertiary trough has a guiding bevel.

16. The tamper-resistant air-permeable container according to claim 1, wherein in a side-view of the primary coupler and the tertiary trough, the primary coupler has a first central axis, and the tertiary trough has a second central axis;
   when the primary coupler is not engaged with the tertiary trough, and the plate is parallel to the flange, the second central axis of the tertiary trough is offset from the first central axis of the primary coupler.

17. The tamper-resistant air-permeable container according to claim 1, wherein the primary coupler or the tertiary trough is made in a top-narrowed and bottom-widened form in a side-view of the tertiary trough.

18. The tamper-resistant air-permeable container according to claim 1, wherein the secondary coupler is torn along the perforation line; the plate restores a home position because of the elasticity thereof, making the secondary coupler moved away and located above the secondary notch with a height difference from the flange.

* * * * *